(12) United States Patent
Lefebvre et al.

(10) Patent No.: US 11,724,473 B2
(45) Date of Patent: Aug. 15, 2023

(54) METHOD FOR COVERING A PRIMARY ELEMENT FOR OPTICAL SPECTACLES WITH PRIMARY MEMBERS MOULDED FROM CORK PARTICLES

(71) Applicant: KILLINE OPTICAL LTD, Macao (MO)

(72) Inventors: Marc René André Louis Lefebvre, Macao (MO); Hervé François Serge Jacquier, Lisbonne (PT)

(73) Assignee: KILLINE OPTICAL LTD, Macao (MO)

( * ) Notice: Subject to any disclaimer, the term of this patent is extended or adjusted under 35 U.S.C. 154(b) by 0 days.

(21) Appl. No.: 17/624,495

(22) PCT Filed: Jul. 2, 2020

(86) PCT No.: PCT/FR2020/051158
§ 371 (c)(1),
(2) Date: Jan. 3, 2022

(87) PCT Pub. No.: WO2021/001632
PCT Pub. Date: Jan. 7, 2021

(65) Prior Publication Data
US 2022/0317474 A1   Oct. 6, 2022

(30) Foreign Application Priority Data

Jul. 2, 2019 (FR) ...................................... 1907321

(51) Int. Cl.
*B29D 12/02* (2006.01)
*B29C 65/70* (2006.01)
(Continued)

(52) U.S. Cl.
CPC .............. *B29D 12/02* (2013.01); *B29C 65/70* (2013.01); *G02C 1/06* (2013.01); *G02C 1/08* (2013.01);
(Continued)

(58) Field of Classification Search
CPC . B29D 12/02; G02C 1/05; G02C 1/06; G02C 5/008; G02C 2200/14
See application file for complete search history.

(56) References Cited

U.S. PATENT DOCUMENTS 2,087,942 A * 7/1937 West ...................... C08L 97/007
                                                            123/193.2
2,155,429 A * 4/1939 Levin .................... C08L 97/007
                                                            524/21
(Continued)

FOREIGN PATENT DOCUMENTS

ES    2412554 A1    7/2013
FR    1560647 A     3/1969
(Continued)

OTHER PUBLICATIONS

Megyery et al., Moonshades Cork Sunglasses, https://www.indiegogo.com/projects/moonshades-cork-sunglasses#/, Aug. 2016 (Year: 2016).*
(Continued)

*Primary Examiner* — Benjamin A Schiffman
(74) *Attorney, Agent, or Firm* — Cantor Colburn LLP

(57) ABSTRACT

A method for purifying powdered silicon carbide is in the form of a starting material to form a silicon carbide having a purity of at least 99.9%. This method has the following method steps: providing a starting material having a grain size of less than 100 μm and a silicon carbide content with at least 98% purity; and heating the starting material in a vacuum or oxygen-free atmosphere to a temperature above 1700° C. over a period of at least 8 minutes.

9 Claims, 3 Drawing Sheets

(51) Int. Cl.
*G02C 5/00* (2006.01)
*G02C 13/00* (2006.01)
*G02C 1/08* (2006.01)
*G02C 5/18* (2006.01)
*G02C 1/06* (2006.01)

(52) U.S. Cl.
CPC .............. *G02C 5/008* (2013.01); *G02C 5/18* (2013.01); *G02C 13/001* (2013.01); *G02C 2200/14* (2013.01)

(56) References Cited

U.S. PATENT DOCUMENTS

| | | | | |
|---|---|---|---|---|
| 2,607,747 | A * | 8/1952 | Billmeyer | C08L 97/007 524/16 |
| 2,607,748 | A * | 8/1952 | Wiley | C08L 97/007 524/926 |
| 2,719,329 | A * | 10/1955 | Gard | C08L 97/007 264/DIG. 57 |
| 5,541,674 | A * | 7/1996 | Jannard | G02C 5/124 351/44 |
| 5,818,569 | A * | 10/1998 | Berent | A61F 9/02 2/452 |
| 7,980,689 | B2 * | 7/2011 | Hsu | B29D 12/02 351/43 |
| 8,283,394 | B2 * | 10/2012 | Pfaadt | E04F 13/18 524/72 |
| 9,220,238 | B2 * | 12/2015 | Tsengas | A01N 25/00 |
| 9,223,149 | B2 * | 12/2015 | Gardaz | G02C 13/001 |
| 9,535,265 | B2 * | 1/2017 | Gardaz | G02C 5/14 |
| 10,942,367 | B2 * | 3/2021 | Gardaz | G02C 5/008 |
| 2012/0113381 | A1 * | 5/2012 | Jacquier | G02C 5/18 351/51 |
| 2021/0181527 | A1 * | 6/2021 | Levich | B29D 12/02 |
| 2021/0221963 | A1 * | 7/2021 | Baker | B27N 3/18 |

FOREIGN PATENT DOCUMENTS

| | | | |
|---|---|---|---|
| JP | S60154916 U | 10/1985 | |
| KR | 20150134668 A | 12/2015 | |
| KR | 102394982 B1 * | 5/2022 | ............ G02C 5/008 |

OTHER PUBLICATIONS

Moonshades Ltd., Moonshades Indiegogo 2016, https://www.youtube.com/watch?v=ZE6F3ZTeWi4, Jul. 5, 2016 (Year: 2016).*

Gábor Megyery, Moonshades Sunglasses, https://www.prodeez.com/post/2016/06/25/moonshades-sunglasses-by-g%C3%A1bor-megyery, Jun. 25, 2016 (Year: 2016).*

Translation of FR1560647A, Feb. 8, 1968 (Year: 1968).*

Translation of KR20150134668A, Dec. 2, 2015 (Year: 2015).*

Anonymous, "Des montures en liège, le défi de Cara D'Pau !", Nov. 26, 2015, URL:https://www.acuite.fr/actualite/collection/83192/des-montures-en-liege-le-defi-de-cara-dpau, XP055692226.

International Search Report dated Oct. 20, 2020 re: Application No. PCT/FR2020/051158, pp. 1-2, Anonymous, "Des montures en liege . . . ", FR 1560647 A, JP S60154916 U and ES 2412554 A1.

* cited by examiner

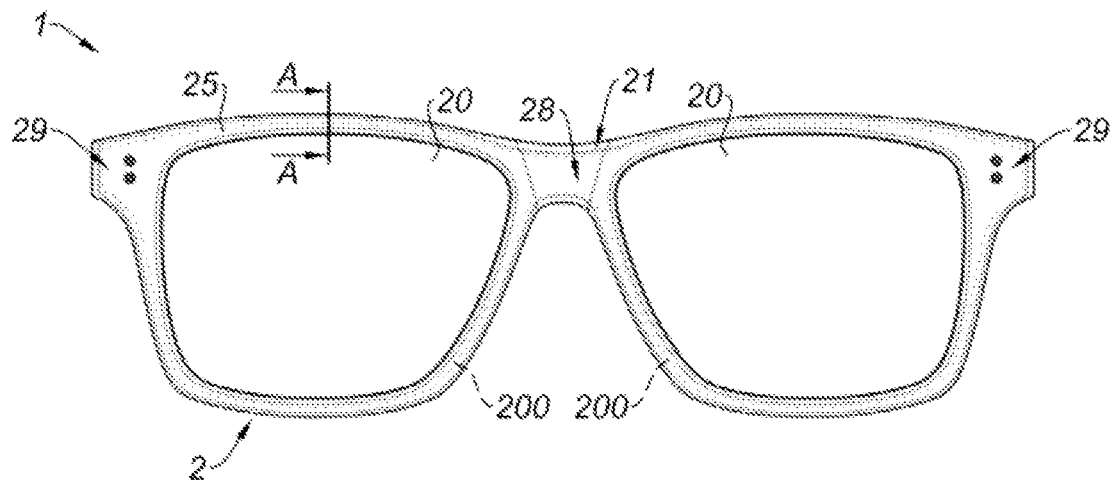
[Fig.1]
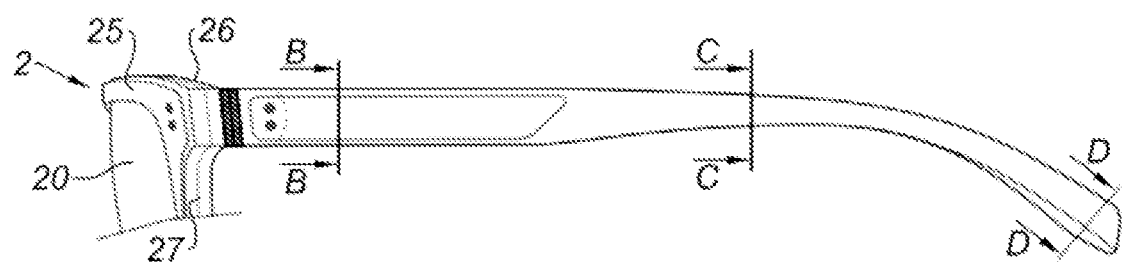
[Fig.2]
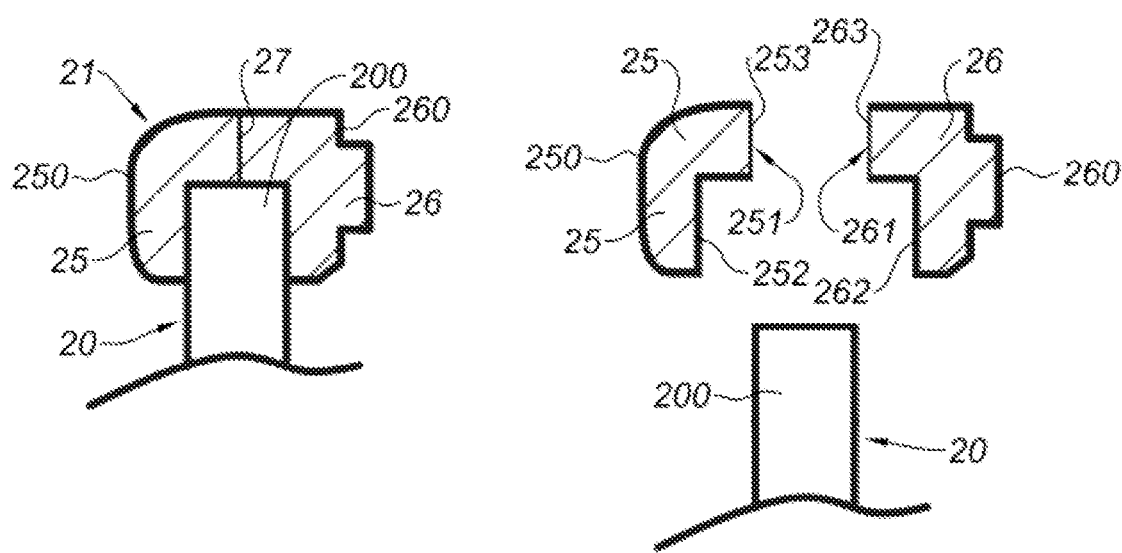
[Fig.3]

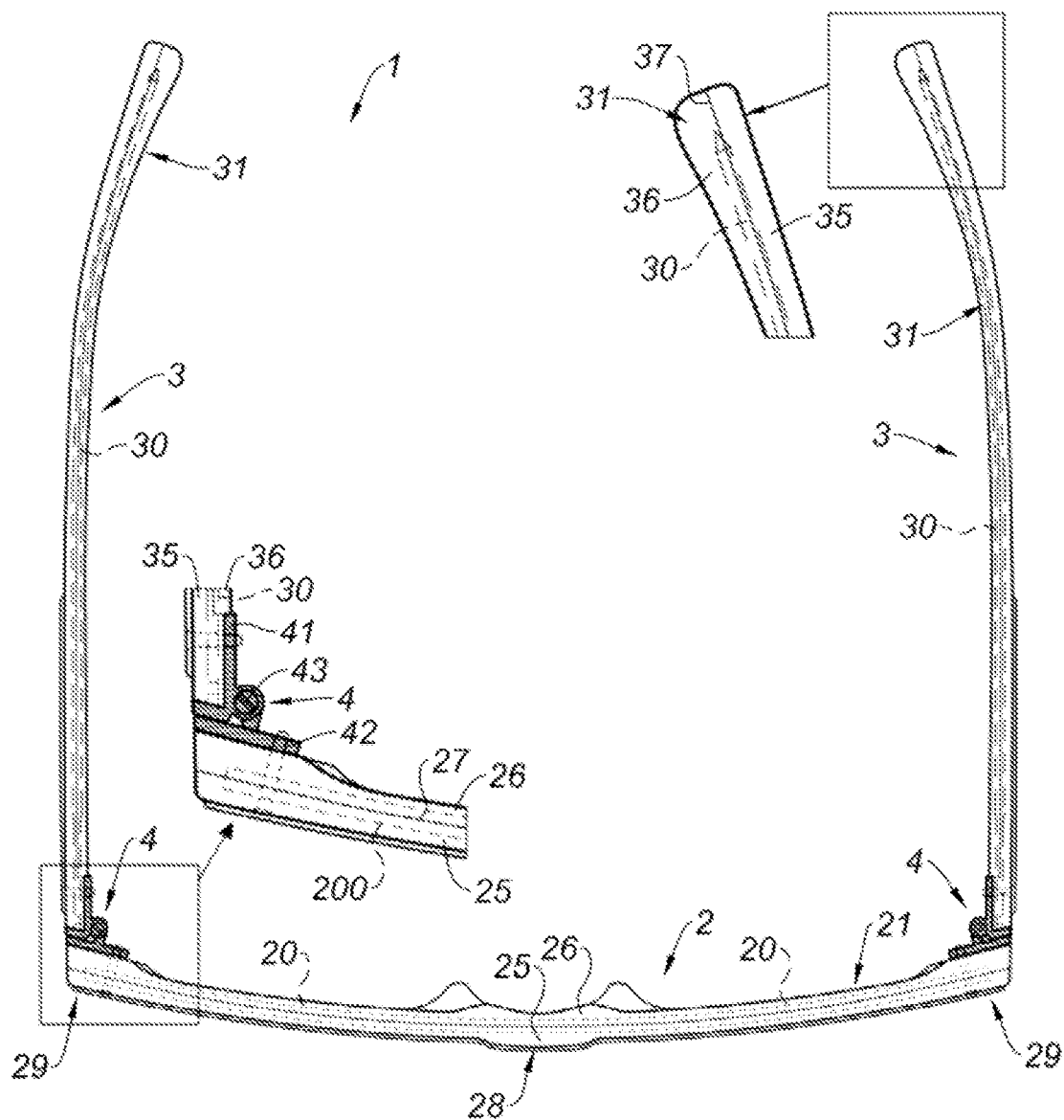
[Fig.4]

[Fig.5]
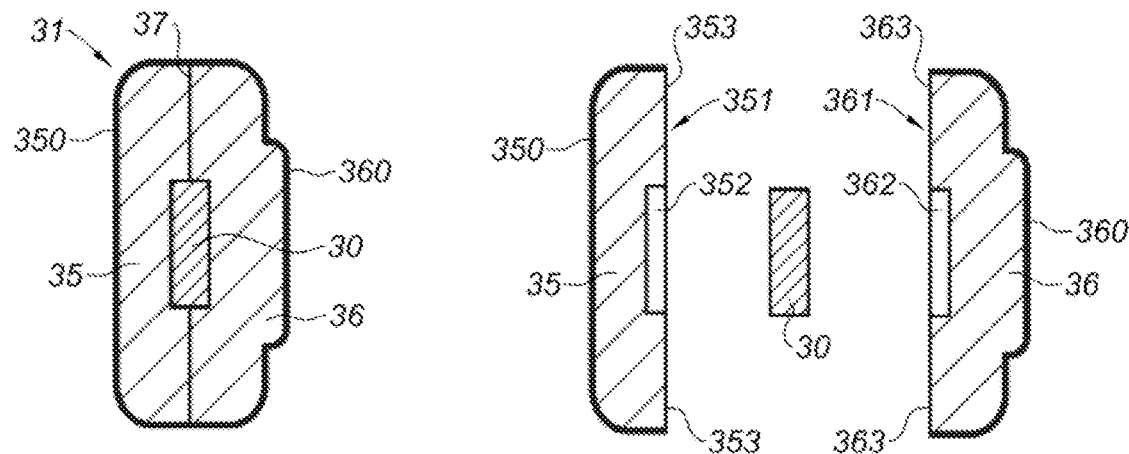
[Fig.6]
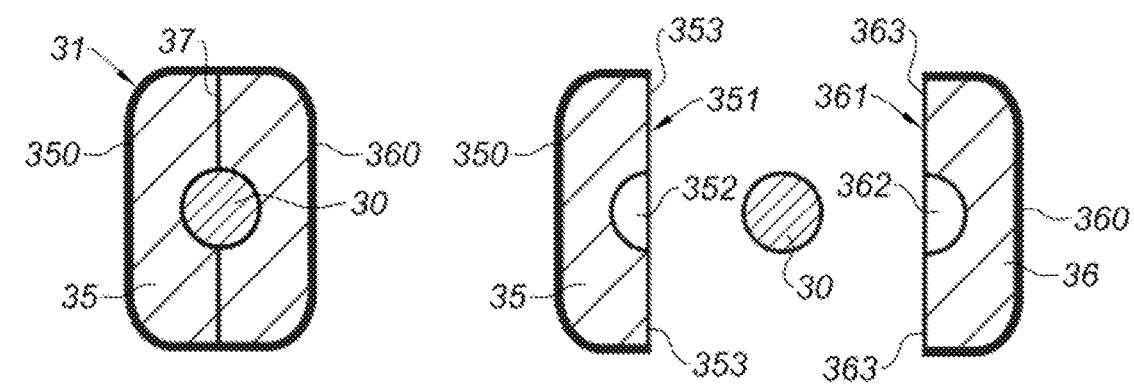
[Fig.7]
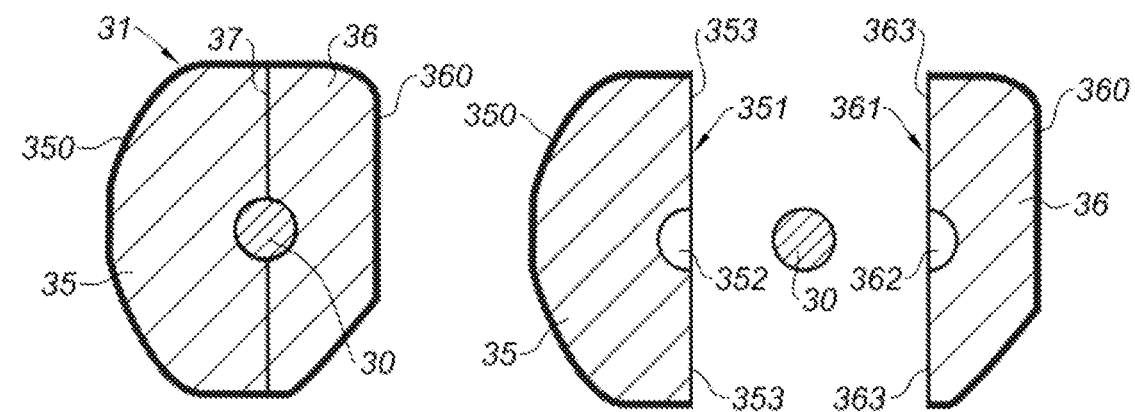

METHOD FOR COVERING A PRIMARY ELEMENT FOR OPTICAL SPECTACLES WITH PRIMARY MEMBERS MOULDED FROM CORK PARTICLES

TECHNICAL FIELD

The disclosure relates to the technical field of the covering of a primary element for optical spectacles, and in particular of an arm frame or of a lens.

The disclosure finds its application in making of spectacles arms, front frames (which supports the two lenses) or even optical spectacles in their entirety.

The disclosure focuses more particularly on the implementation of an at least partial embedding of a primary element for optical spectacles, by an outer covering lining composed, in part, of cork.

BACKGROUND

Cork is a material with multiple qualities: natural origin, impact resistance, malleability, impermeability, hypoallergenic nature, resistance to rotting, durability, thermal comfort, buoyancy, etc.

It is thus known from the document KR 20150134668A to cover an arm frame by means of pre-cut cork sheets, sewn together, plated and glued around the arm frame, which has several drawbacks: thin thickness of the cork sheets, the shape of the arm is determined by the arm frame—and not by the cork sheets—thus limiting the aesthetics, and also imposing many steps (cutting, sewing, plating and gluing).

SUMMARY

The disclosure aims at overcoming all or part of the aforementioned drawbacks by proposing a method for covering a primary element for optical spectacles, which makes it possible to obtain an outer covering lining composed in part of cork and with controlled aesthetics, and with a controlled thickness and in particular large thicknesses compared to those provided by cork sheets of the state of the art.

To this end, the disclosure relates to a method for covering a primary element for optical spectacles, in which is implemented an at least partial embedding of the primary element by an outer covering lining in order to obtain a functional element of optical spectacles, said covering method being remarkable in that it comprises the following steps:

preparing a molding composition comprising at least one mixture of cork particles in a thermoformable elastomeric material;

making a first embedding member and a second embedding member by molding the molding composition, the first embedding member having a first outer face and a first inner face in which is formed a first groove bordered by at least one first bearing area, and the second embedding member having a second outer face and a second inner face in which is formed a second groove bordered by at least one second bearing area;

positioning the first embedding member and the second embedding member around the primary element, such that said primary element is positioned inside the first groove and the second groove, and that the at least one first bearing area and the at least one second bearing area are in contact with one another;

securing the at least one first bearing area and the at least one second bearing area, so that the first embedding member and the second embedding member form the outer covering lining embedding at least partially the primary element.

Thus, such a method makes it possible to have an outer covering lining composed in part of cork (by the mixture of cork particles) and with controlled aesthetics (by the molding of the first and second primary embedding elements), to the extent that the shape will be given by these first and second primary embedding elements.

Moreover, the first and second primary embedding elements are secured edge-to-edge at the level of their respective bearing areas, without these first and second primary embedding elements being fixed to the primary element, this primary element therefore remaining free inside the outer covering lining.

According to one feature, the cork particles have a particle size comprised between 0.2 and 1 millimeter.

Indeed, such a particle size is particularly suitable for meeting the conventional dimensions of optical spectacles, for having a shape of the outer covering lining with an improved level of detail.

According to one possibility, the thermoformable elastomer material is selected from a thermoplastic elastomer, such as for example a polyurethane, or a natural elastomer, such as for example a rubber.

It is in particular possible to consider using a polyurethane certified by the FDA "Food and Drug Administration", also known as "PU FDA", which has the advantage of obtaining flexible embedding members and a soft touch.

In general, it is of course advantageous to adjust the density of the thermoformable elastomeric material as well as the proportions between the cork particles and the thermoformable elastomeric material.

According to another possibility, the molding composition comprises, in percentage by mass, between 60 and 90% of mixture of cork particles and between 10 and 30% of thermoform able elastomer material.

Indeed, such proportions are advantageous for the aesthetic side of the cork which will be clearly visible on the outer coveting lining, while providing control of the elasticity/rigidity of the outer covering lining by means of the thermoformable elastomer material.

According to another possibility, securing the at least one first bearing area and the at least one second bearing area is achieved by a gluing between the at least one first bearing area and the at least one second bearing area which are in contact.

Thus, the first and second primary embedding elements are glued edge-to-edge at the level of their respective bearing areas.

In a particular embodiment, the primary element is an arm frame for optical spectacles, so that the functional element constitutes an arm of optical spectacles.

Thus, upon completion of the covering method applied to an arm frame, an arm composed at least in part of the arm frame embedded in the outer covering lining is obtained.

Advantageously, the first groove is bordered by two first bearing areas extending on either side of the first groove, the second groove is bordered by two second bearing areas extending on either side of the second groove, so that the arm frame is completely embedded inside the outer covering lining.

Thus, the arm frame is no longer visible and constitutes the inner structure of the arm obtained upon completion of the covering method, it is noted that the outer covering lining may extend over all or part of the length of the arm frame.

In another particular embodiment, the primary element is a pair of lenses for optical spectacles, such that the functional element constitutes a front part of optical spectacles.

Thus, upon completion of the covering method applied to the pair of lenses, a front part composed of the two lenses supported by the outer covering lining is obtained; such an outer covering lining thus forming a front part mount adapted to support the two lenses.

Advantageously, the first groove is bordered by a unique first bearing area, the second groove is bordered by a unique second bearing area, so that the lens is partially embedded inside the outer covering lining with edges of the pair of spectacles embedded inside the outer covering lining.

The disclosure also relates to a functional element of optical spectacles, comprising a primary element embedded at least partially inside an outer covering lining, said functional element being remarkable in that the primary element is covered with the outer covering lining by implementing the covering method according to the disclosure, such that:

the outer covering lining is formed of a first embedding member and a second embedding member obtained by molding a molding composition comprising at least one mixture of cork particles in a thermoformable elastomeric material;

the first embedding member has a first outer face and a first inner face in which is formed a first groove bordered by at least one first bearing area, and the second embedding member has a second outer face and a second inner face in which is formed a second groove bordered by at least one second bearing area;

the primary element is positioned inside the first groove and the second groove, and the at least one first bearing area and the at least one second bearing area are in contact with one another and are secured to each other.

In a particular embodiment, the primary element is an arm frame for optical spectacles, so that the functional element constitutes an arm of optical spectacles.

According to one feature, the first groove is bordered by two first bearing areas extending on either side of said first groove, the second groove is bordered by two second bearing areas extending on either side of said second groove, so that the arm frame is completely embedded inside the outer covering lining.

In another particular implementation, the primary element is a pair of lenses for optical spectacles, so that the functional element constitutes a front part of optical spectacles.

According to one feature, the first groove is bordered by a unique first bearing area, the second groove is bordered by a unique second bearing area, so that the pair of lenses is partially embedded inside the outer covering lining with edges of the pair of lenses embedded inside the outer covering lining.

The disclosure also concerns optical spectacles comprising two arms as described above, that is to say two arms each composed of an arm frame embedded at least partially inside an outer covering lining upon completion of a covering method according to the disclosure.

The disclosure also concerns optical spectacles comprising a front part as described above, that is to say a front part composed of a pair of lenses partially embedded inside an outer covering lining upon completion of a covering method according to the disclosure.

In an advantageous embodiment, the two arms are articulated by hinges on the font part.

BRIEF DESCRIPTION OF THE DRAWINGS

Other features and advantages of the present disclosure will become apparent upon reading the detailed description hereinafter, of a non-limiting example of implementation, made with reference to the appended schematic figures in which:

FIG. 1 is a schematic front view of optical spectacles according to the disclosure; obtained by the implementation of a covering method according to the disclosure;

FIG. 2 is a schematic side view of the optical spectacles of FIG. 1;

FIG. 3 is a schematic sectional view of the optical spectacles of FIGS. 1 and 2, according to an sectional plane A-A shown in FIG. 1 and which cuts in the front part, with an unexploded version (to the left) and an exploded version (to the right);

FIG. 4 is a schematic top view of the optical spectacles of FIGS. 1 and 2, with two zooms on two distinct areas;

FIG. 5 is a schematic sectional view of the optical spectacles of FIGS. 1 and 2, according to a sectional plane B-B shown in FIG. 2 and which cuts in the arm, with an unexploded version (to the left) and an exploded version (to the right);

FIG. 6 is a schematic sectional view of the optical spectacles of FIGS. 1 and 2, according to a sectional plane C-C shown in FIG. 2 and which cuts in the arm, with an unexploded version (to the left) and an exploded version (to the right); and FIG. 7 is a schematic sectional view of the optical spectacles of FIGS. 1 and 2, according to a sectional plane D-D shown in FIG. 2 and which cuts in the arm with an unexploded version (to the left) and an exploded version (to the right).

DETAILED DESCRIPTION OF THE DRAWINGS

With reference to the figures, optical spectacles 1, according to a non-limiting embodiment of the disclosure, comprise:

a front part 2 comprising a pair of lenses 20 partially embedded inside a front part mount 21, this front part mount 21 forming an outer covering lining for the pair of lenses;

two arms 3 each comprising an arm frame 30 embedded inside a sleeve 31, this sleeve 31 forming an outer covering lining for the corresponding arm frame 30.

The embedding of the pair of lenses 20 by the front part mount 21 to form the front part 2 is obtained upon completion of a method for covering the pair of lenses 20. Likewise, the embedding of each arm frame 30 by the corresponding sleeve 31 to form the considered arm 3 is obtained upon completion of a method for covering each of the two arm frames 30.

The two lenses 20 are for example corrective lenses or neutral lenses without correction and/or tinted lenses, smoked lenses or non-tinted lenses. The two lenses 20 are, for example, separate lenses, or alternatively associated lenses in the form of a single-piece mask.

This covering method comprises a step for preparing a molding composition comprising at least one mixture of cork particles in a thermoformable elastomer material.

The cork particles have a particle size comprised between 0.2 and 1 millimeter. The thermoformable elastomer material is selected from a thermoplastic elastomer, such as for example a polyurethane, or a natural elastomer, such as for example a rubber. The molding composition comprises, in percentage by mass, between 60 and 90% of mixture of cork particles and between 10 and 30% of thermoformable elastomer material.

The molding composition may also integrate additives, such as for example and without limitation a dye which allows coloring in the mass, a crosslinking agent, a catalyst agent, etc.

It should be noted that the molding composition may differ depending on whether it is used for the embedding of the pair of lenses 20 by the front part mount 21 or for the embedding of the arm frames 30 by the sleeves 31. Indeed, it may be advantageous to have a mount 21 that has greater rigidity than the sleeves 31, while preserving impact resistance, and to have sleeves 31 with greater flexibility than the front part mount 21 to enable a deformation/bending of the arms 3 responding to customized adjustments requested in the optics.

The front part mount 21 is made by assembling and securing two embedding members 25, 26, namely a first embedding member 25 oriented outwardly of the optical spectacles 1 and a second embedding member 25 oriented inwardly of the optical spectacles 1 (facing the wearer's face), where these two embedding members 25, 26 are obtained by molding the molding composition, in this case the molding composition dedicated to the front part mount 21.

Likewise, each sleeve 31 is made by assembling and securing two embedding members 35, 36, namely a first embedding member 35 oriented outwardly of the optical spectacles 1 and a second embedding member 36 oriented inwardly of the optical spectacles 1, where these two embedding members 35, 36 are obtained by molding the molding composition, in this case the molding composition dedicated to the sleeve 31 which may be distinct from the molding composition dedicated to the front part mount 21.

The remainder of the description relates to the method for covering the pair of lenses 20, in order to make the front part 2 with the front part mount 21 which embeds the pair of lenses 20.

This method for covering the pair of spectacles 20 implements a step of making the first embedding member 25 and the second embedding member 26 by molding the considered molding composition, where as illustrated in FIG. 3:

the first embedding member 25 has a first outer face 250 and a first inner face 251 in which is formed a first groove 252 bordered by a unique first planar bearing area 253, and the second embedding member 26 has a second outer face 260 and a second inner face 261 in which is formed a second groove 262 bordered by a unique second planar bearing area 263, During the molding operation, the temperature and pressure conditions will depend in particular on the molding composition (proportion and particle size of the cork particles, choice of the thermoformable elastomer material), it is noted that the temperature will be, for example, between 90 and 140° C. and the pressure will be, for example, between 120 and 160 bars.

This method for covering the pair of lenses 20 then implements a step of positioning the first embedding member 25 and the second embedding member 26 around the edges 200 of the pair of lenses 20, so that the edges 200 of the pair of lenses 20 are positioned inside the first groove 252 and the second groove 262, and that the first bearing area 253 and the second bearing area 263 are in contact with one another according to a joint plane 27.

This method for covering the pair of lenses 20 then implements a step of securing, for example by gluing or by thermal welding, the first bearing area 253 and the second bearing area 263, so that the first embedding member 25 and the second embedding member 26 form the front part mount 21 embedding the edges 200 of the pair of lenses 20.

It is advantageous to retain the securing solution by gluing, for example by using vinyl glue or wood glue. The purpose of this securing step is only to connect the embedding members 25, 26 together, but not to fix the pair of lenses 20 on the embedding members 25, 26, this pair of lenses 20 have to remain free inside the grooves 252, 262.

Thus, when in place, the first groove 252 and the second groove 262 together form a slide opening outwardly and inside which the edges 200 of the pair of lenses 20 are inserted.

It should be noted that the geometric shapes and/or the dimensions (in particular the thicknesses) of the first embedding member 25 and of the second embedding member 26 may vary along the edges 200 of the pair of lenses 20, in particular to have a front part mount 21 that has in the middle, between the two lenses 20, a central arch 28 adapted to rest on the wearer's nose, and which has on the sides lateral flanges 29 on which the respective arms 3 are articulated.

The remainder of the description relates to the method for covering an arm frame 30, in order to make an arm 3 with the sleeve 31 which embeds the arm frame 30.

This method for covering the arm frame 30 implements a step of making the first embedding member 35 and the second embedding member 36 by molding the relevant molding composition, where as illustrated in FIGS. 5 to 7:

the first embedding member 35 has a first outer face 350 and a first inner face 351 in which is formed a first groove 352 bordered by two planar and coplanar first bearing areas 353, these two first bearing areas 353 extending on either side of the first groove 352; and the second embedding member 36 has a second outer face 360 and a second inner face 361 in which is formed a second groove 362 bordered by two planar and coplanar second bearing areas 363, these two second bearing areas 363 extending on either side of the second groove 362.

This method for covering the arm frame 30 then implements a step of positioning the first embedding member 35 and the second embedding member 36 around the arm frame 30, so that the arm frame 30 is positioned inside the first groove 352 and the second groove 362, and that the two first bearing areas 353 and the two second bearing areas 263 are in respective contact with one another according to a joint plane 37.

This method for covering the arm frame 30 then implements a step of securing, for example by gluing or by thermal welding, the two first bearing areas 353 and the two second bearing areas 263 respectively so that the first embedding member 35 and the second embedding member 36 form the sleeve 31 completely embedding the arm frame 30.

It is advantageous to retain the securing solution by gluing, for example by using vinyl glue or wood glue. The purpose of this securing step is only to connect the embedding members 35, 36 to one another, but not to fix the arm frame 30 on the embedding members 35, 36, this arm frame 30 has to remain free inside the grooves 352, 362.

Thus, when in place, the first groove 352 and the second groove 362 form together a closed inner channel inside which the arm frame 30 is inserted. As shown in FIGS. 5 to 7, the section of the grooves 352, 362 may vary along the arm frame 30, whether in their geometric shapes and/or in their dimensions. Likewise, the geometric shapes and/or the dimensions (in particular the thicknesses) of the first embedding member 35 and of the second embedding member 36 may vary along the arm frame 30.

Once the arms 3 and the front part 2 are made, all it needs is to fix the arms 3 on the respective lateral flanges 29 of the front part mount 21 by means of hinges 4, so that the two arms 3 are articulated by these hinges 4 on the front part 2. Each hinge 4 comprises:

a first knuckle 41 fixed on an arm 3, and in particular fixed on the second outer face 360 of the second embedding member 36; and a second knuckle 42 coupled to the first knuckle 41 via a pivot pin 43, where this second knuckle 42 is fixed to the front part 2, and in particular fixed on the second outer face 260 of the second embedding member 26.

The knuckles 41, 42 are for example fixed by riveting or by screwing, so that rivets or screws make it possible to mechanically create a coherent and resistant assembly, even though other fixing options could be considered. Rivets or screws may possibly pass through the lenses 20 and/or the frames 30 for increased mechanical strength.

It should be noted that, during the molding operations of the embedding members 25, 26, 35, 36, patterns, ornaments, locations for receiving inserts (for example of the logo type) and/or reserves for more mechanical purposes for the knuckles 41, 42 may be provided directly in the concerned molds, or alternatively may be provided by post-molding machining.

The invention claimed is:

1. A method for covering a primary element for optical spectacles, wherein at least a partial embedding of the primary element is implemented by an outer covering lining in order to obtain a functional element of optical spectacles, said covering method includes the following steps:

preparing a molding composition comprising at least a mixture of cork particles in a thermoformable elastomeric material;

making a first embedding member and a second embedding member by molding the molding composition, the first embedding member having a first outer face and a first inner face in which is formed a first groove bordered by at least one first bearing area, and the second embedding member having a second outer face and a second inner face in which is formed a second groove bordered by at least one second bearing area;

positioning the first embedding member and the second embedding member around the primary element, such that said primary element is positioned inside the first groove and the second groove, and that the at least one first bearing area and the at least one second bearing area are in contact with one another; and securing the at least one first bearing area and the at least one second bearing area, so that the first embedding member and the second embedding member form the outer covering lining embedding at least partially the primary element.

2. The covering method according to claim 1, wherein the cork particles have a particle size comprised between 0.2 mm and 1 mm.

3. The covering method according to claim 1, wherein the thermoformable elastomeric material is selected from a thermoplastic elastomer or a natural elastomer.

4. The covering method according to claim 1, wherein the molding composition comprises, in percentage by mass, between 60% and 90% of cork particles mixture and between 10% and 30% of thermoformable elastomer material.

5. The covering method according to claim 1, wherein securing of the at least one first bearing area and of the at least one second bearing area is achieved by gluing between the at least one first bearing area and the at least one second bearing area which are in contact.

6. The covering method according to claim 1, wherein the primary element is an arm frame for optical spectacles, such that the functional element constitutes an arm of optical spectacles.

7. The covering method according to claim 6, wherein the first groove is bordered by two first bearing areas extending on either side of said first groove, the second groove is bordered by two second bearing areas extending on either side of said second groove, so that the arm frame is completely embedded inside the outer covering lining.

8. The covering method according to claim 1, wherein the primary element is a pair of lenses for optical spectacles, so that the functional element constitutes a front part of optical spectacles.

9. The covering method according to claim 8, wherein the first groove is bordered by a single first bearing area, the second groove is bordered by a single second bearing area, such that the pair of lenses is partially embedded inside the outer covering lining with edges of the pair of lenses embedded inside the outer covering lining.

* * * * *